Figure 1:
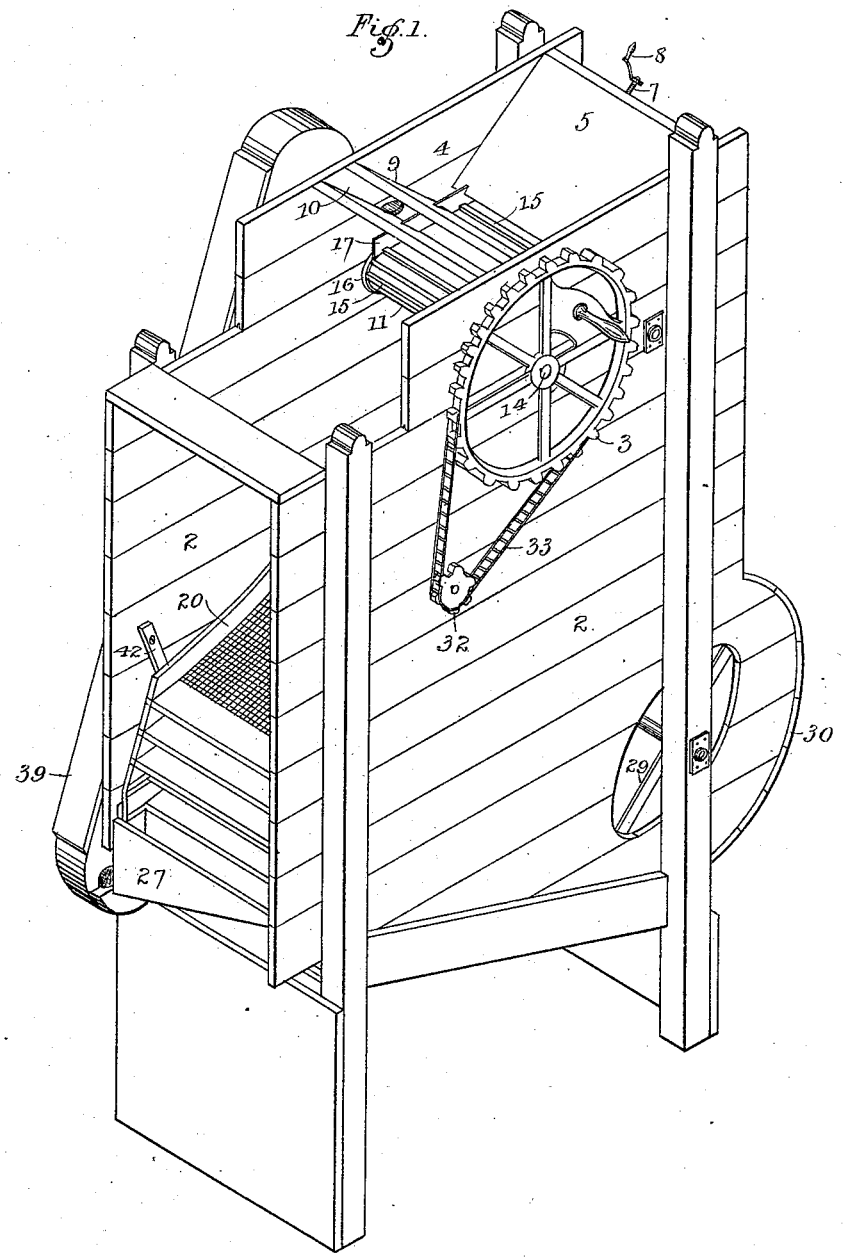

(No Model.) 2 Sheets—Sheet 1.

J. LUCAS.
GRAIN AND SEED SEPARATOR.

No. 555,577. Patented Mar. 3, 1896.

Witnesses:-
C. L. Caldwell.
A. Mar Welch.

Inventor:-
John Lucas

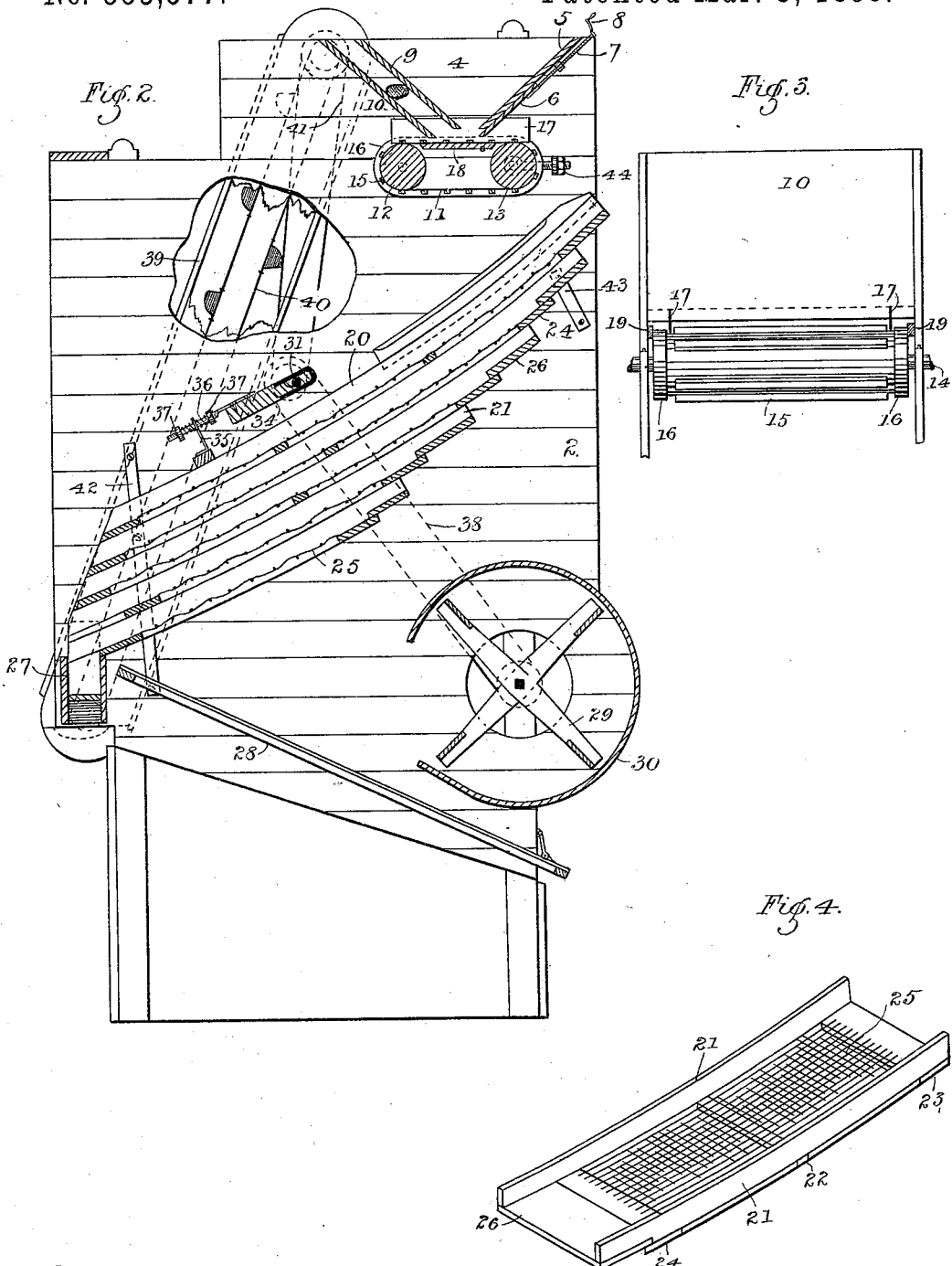

UNITED STATES PATENT OFFICE.

JOHN LUCAS, OF HASTINGS, MINNESOTA.

GRAIN AND SEED SEPARATOR.

SPECIFICATION forming part of Letters Patent No. 555,577, dated March 3, 1896.

Application filed September 16, 1890. Serial No. 365,131. (No model.)

*To all whom it may concern:*

Be it known that I, JOHN LUCAS, of Hastings, Dakota county, Minnesota, have invented certain Improvements in Grain and Seed Separators, of which the following is a specification.

This invention relates to grain-separating machines; and it consists in the construction, combination, and arrangement of parts, as hereinafter shown and described, and specifically pointed out in the claims.

In the drawings forming part of this specification, Figure 1 is an isometrical view of my improved separator. Fig. 2 is a vertical longitudinal section of the same, showing the arrangement of the hoppers, feed-belt, and sieves and their connections. Fig. 3 is a detail end elevation of the feed belt and hopper. Fig. 4 is a detail of one of the sieves.

In the drawings, 2 represents the body of my improved separator, which may be of ordinary dimensions and construction, and 3 is the drive or crank wheel by means of which the mill is operated. Arranged in the top of the mill in the ordinary position is the hopper 4, one of the inclined walls 5 of which is provided with the adjustable gate 6, which is raised and lowered preferably by means of the screw 7 and handle 8, so as to regulate the flow of grain from the hopper. The other inclined wall 9 is formed double, so as to provide a secondary hopper 10, for the purpose hereinafter described.

Arranged underneath the hoppers is the endless feed-belt 11 carried upon rolls 12 and 13 and passing in its movement underneath the opening of the hoppers. This belt is driven preferably directly from the drive-wheel 3, which is mounted upon the shaft 14 of one of the rolls. This belt 11 may be made of any suitable material, such as canvas, and provided with cleats 15 running transversely thereof, so as to hold and carry forward the grain deposited upon it. I do not confine myself to this material and construction, but any flexible material which has a "piled" or corrugated or roughened surface may be employed efficiently for the same purpose.

With the construction shown herein I prefer to form the belt with thickened or raised edges, which may be made readily by fastening upon the belt narrow belts of leather 16, thus forming guards to hold the grain on the belt. The cleats 15 are slightly shorter than the distance between the guards 16, thus forming a narrow space between them and the guards. Arranged in a fixed position above the belt and longitudinally thereof, and so as to stand between the cleats and guards, are the guides 17, made preferably of sheet metal. They serve as guides against which the guards 16 will strike if there be any lateral movement of the belt, and both together serve as efficient guards to prevent the grain falling off the edges of the belt, the guides 17 being arranged so that the belt runs close to them.

In order to support the upper part of the belt in a horizontal position, I arrange a supporting-board 18 between the rolls and in such position that the belt will rest upon and travel over it. Close to either edge of the belt I also arrange guides 19, which serve to hold it from lateral movement.

Arranged within the mill and underneath the feed-belt I provide a hurdle of sieves 20, inclined in the opposite direction from that of the travel of the belt 11, and with the upper end of the top sieve projecting slightly beyond and close to the outer end of the belt. These sieves are of peculiar and novel construction, and of novel arrangement in the mill.

Where grain is deposited in a machine of this class upon a straight inclined sieve it is liable to pile up or stop near the top of the sieve, and after being started by the movement of the sieve will be accelerated in its descent and thus pass over the sieve without all of the grain being brought into contact with it so as to be cleaned. To avoid this objection I form my sieve slightly curved with the concave side up, as shown best in detail, Fig. 4. As will readily be seen, the grain on being deposited on the top and steepest part of the sieve descends first rapidly on account of the pitch, but with the increased momentum the incline of the sieves becomes less and less, whereby the movement of the grain is retarded, and it thus may be carried with almost an absolutely-uniform movement over the entire length of the sieve. These sieves may be constructed in any preferred form— as, for example, as shown in Fig. 4, with side pieces 21 and cross-bars 22, 23 and 24, to which is secured the wire-netting 25, the cross-pieces being arranged beneath and supporting the netting and the side pieces extending above to form guards. The upper end of each sieve is provided with one or more cross pieces or steps 26 overlapping and resting upon the cross-pieces 24. The grain thus strikes first upon the step 26 and drops from it upon the cross-piece 24, thus tending to throw the lighter grain upon the top of the mass—as, for example, in separating oats from wheat the oats are carried on top and delivered off the end of the sieve. Each of the sieves is shorter than the one immediately above it, and is placed underneath the lower end of the hopper-sieve, the tail of all the sieves thus being very nearly in the same vertical line and the pitch of each sieve less than that of the sieve above it. The step 26 of each sieve projects slightly under the edge of the cross-piece 23 of the sieve above, and preferably with a slight space between. The object in thus shortening and arranging the sieves in descending series is that as the grain passes over one sieve it is partially cleaned and the amount of the material is diminished, so that in order to keep the series uniformly loaded much less area is required for the lower than for the upper sieve, the object being to keep the lower sieves, particularly the last two, at all times "flooded" with grain, so as to carry the light and unseparated grain over the end. The upper sieves of the hurdle open to the rear of the machine, so that the chaff, oats and other light materials are thrown off them and outside the mill. The last two, however, I prefer to arrange with a trough 27, underneath their ends, which are set farther back than the outer ends of the other sieves. By this means the material which runs off the tail of the bottom sieve is deposited in the trough or receptacle 27. The wheat which passes through the last sieve drops upon an oppositely-inclined screen 28, through which the foul seeds pass, while the wheat itself is carried off and delivered in the front of the machine in the usual manner.

Arranged between the screen 28 and the hurdle of sieves is the fan 29 inclosed in the case 30 in the ordinary manner, so as to direct the current of air against the under side of the bottom sieve only. The object of this arrangement of the fan is to avoid the disturbance of the grain by an air-current while passing over the upper part of the upper sieve, and to concentrate the air-blast upon the grain as it lies upon the bottom sieve to blow the dust and lighter material out of it and to prevent the passing of unseparated grain through the sieve if by any chance it is at any time not completely flooded. The hurdle of the sieves is hung at the lower end upon the arm 42, pivotally secured to the body of the mill, and supported at the upper end on arms 43 pivotally secured to the side walls of the mill below the hurdle. The hurdle is oscillated by means of the crank-shaft 31, carrying the pinion 32, which is driven from the drive-wheel 3 by means of the link chain 33 in the ordinary manner. The crank of the shaft 31 is connected to a bar or pitman 34, which is held in suitable guides or other supports, and which is thus caused to reciprocate by the rotation of the shaft 31. Connected to this pitman or reciprocating bar is the arm or standard 35, which is rigidly secured to the hurdle, and thus causes the hurdle to be oscillated with the movement of the bar. Springs 36, arranged on either side of the standards 35 and between it and the guides 37, serve as cushions to check the oscillating movement at either limit, and thus to prevent undue shaking and wear of the parts. The upper end of the screen 28 is hung on the arm 42 and the lower end on suitable swinging or link supports, so that it is oscillated with the hurdle, but with a greater throw to thoroughly clean the wheat from foul seeds. The fan is driven preferably by means of a belt or chain 38, running to its shaft from the shaft 31.

Connecting with the trough or receptacle 27 is the elevator-shaft 39, in which runs a cup-belt 40, carried upon suitable pulleys at the bottom and top of the shaft, the upper pulley being driven preferably by means of a belt 41 running from a drum upon the shaft 31. The elevator-belt takes the grain or "tailings" which pass from the bottom sieves into the trough and carries them up and delivers them into the secondary hopper 10, whence they are delivered again on the feed-belt 11 and passed through the mill, thus insuring a thorough cleaning of the grain without waste. To regulate the tension of the feed-belt, I arrange the forward roll in sliding bearings and connect to it the adjusting-screw 44, by turning the nut of which the roll may be moved forward or backward, as desired.

By this improved construction I am enabled to economize the space in the body of the mill and extend the hurdle of sieves from the front to the rear, thereby utilizing the full depth of the mill, the grain to be cleaned being delivered at the extreme front upon the upper screen by means of the feed-belt.

One important advantage gained by the use of the secondary hopper to receive the tailings of the mill and deliver them to the feed-belt in the manner described is that the tailings are thus first deposited on the belt and the fresh uncleaned grain in the main hopper is deposited upon the tailings, whereby I insure the feeding of the unclean grain, so that the amount of tailings passing through the mill is reduced to the minimum. By the construction of the series of sieves in the hurdle, as described, the top sieve being several times the length of the bottom one, all that passes through each sieve is delivered to the one below it, and the flooding of the last sieve at all times is insured. The cross pieces or steps at the upper ends of the sieve tend, also, as has been set forth, to throw the lighter grain of the product of the sieve above downward on top of the mass upon the lower part of the sieve, the result of all which is that the short heavy grain and small seeds only are allowed to come in contact with the surface of the last sieve and to pass through it, while the light grain resting upon the surface is carried over the end as tailings. Where the last sieve of a series is not flooded for its entire length, more or less unseparated grain will pass through the lower portion, which has to be carried off and passed through the mill for more thorough cleaning by means of a "cut-off" arranged underneath the sieve, whereas with my improved construction all that passes through the lower sieve is separated grain and requires no further cleaning than the screening from foul seeds. In other words, the hurdle is so constructed that the upper sieves are of such length that the product from them will at all times completely "flood" the lowest sieve, so as to dispense with the necessity of a cut-off underneath for the unseparated grain, its entire product being separated grain.

The spaces between the upper ends of the sieves are closed, so that air-currents cannot pass through between the sieves and disturb the flow of the grain over the "steps" or imperforate portions. This is an important feature of my invention, as otherwise the air-currents generated by the fan flowing back or forth between the seives would greatly interfere with the perfect coaction of the parts.

Having thus described my invention, what I claim as new is—

1. In a device of the class described, the combination of the main hopper, a secondary hopper in the rear of the same, and an endless force-feed belt traveling closely underneath said hoppers toward the front of the mill, whereby the contents of the secondary hopper are deposited upon the belt, underneath the grain delivered from the main hopper, substantially as described.

2. In a device of the class described, the combination with main hopper and secondary hopper in the rear of the same, of an endless force-feed belt traveling closely underneath the same, means for controlling the amount of load to be carried by said belt, a plane support for the upper part of said belt, raised edges upon said belt, and fixed depending strips arranged longitudinally of said belt, inside of said raised edges, substantially as described.

3. In a separator, the combination of main and secondary hoppers and a feed-belt traveling underneath said hoppers, a receptacle for unseparated grain delivered from the bottom sieves of said series, and an elevator adapted to convey the same from said receptacle to said secondary hopper, substantially as and for the purpose set forth.

4. In a device of the class described, the combination of the hopper 4, the secondary hopper 10, the feed-belt 11, the drive-wheel 3, mounted upon the feed-shaft 14, the hurdle of sieves 20, the crank-shaft 31 connected to and driven from said feed-shaft, a fan 29 connected to and driven from said crank-shaft and the tailings-elevator 40 connected to and driven from the crank-shaft, substantially as and for the purpose set forth.

In testimony whereof I have hereunto set my hand this 12th day of September, 1890.

JOHN LUCAS.

In presence of—
T. D. MERWIN,
A. MAE WELCH.